US012690051B2

(12) United States Patent
Ren

(10) Patent No.: US 12,690,051 B2
(45) Date of Patent: Jul. 21, 2026

(54) INFORMATION PROCESSING METHOD, TERMINAL, AND READABLE STORAGE MEDIUM

(71) Applicant: DATANG MOBILE COMMUNICATIONS EQUIPMENT CO., LTD., Beijing (CN)

(72) Inventor: Xiaotao Ren, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 293 days.

(21) Appl. No.: 18/292,904

(22) PCT Filed: Jul. 5, 2022

(86) PCT No.: PCT/CN2022/103851
§ 371 (c)(1),
(2) Date: Jan. 27, 2024

(87) PCT Pub. No.: WO2023/011086
PCT Pub. Date: Feb. 9, 2023

(65) Prior Publication Data
US 2024/0365343 A1     Oct. 31, 2024

(30) Foreign Application Priority Data
Aug. 5, 2021    (CN) ......................... 202110897740.X

(51) Int. Cl.
*H04W 72/25*          (2023.01)
*H04W 72/0446*      (2023.01)

(52) U.S. Cl.
CPC ....... *H04W 72/25* (2023.01); *H04W 72/0446* (2013.01)

(58) Field of Classification Search
None
See application file for complete search history.

(56) References Cited

U.S. PATENT DOCUMENTS

| | | | |
|---|---|---|---|
| 2019/0053267 A1* | 2/2019 | Kim ...................... | H04W 76/14 |
| 2019/0097751 A1* | 3/2019 | Li ......................... | H04W 4/027 |

(Continued)

FOREIGN PATENT DOCUMENTS

| | | |
|---|---|---|
| CN | 110972290 A | 4/2020 |
| CN | 112840586 A | 5/2021 |

(Continued)

OTHER PUBLICATIONS

Supplementary European Search Report in European application No. 22851801.5, issued on May 22, 2025.

(Continued)

*Primary Examiner* — Phirin Sam
(74) *Attorney, Agent, or Firm* — Harness, Dickey & Pierce, P.L.C.

(57) ABSTRACT

An information processing method, a terminal and a readable storage medium are provided. The information processing method includes: transmitting, by a first terminal, indication information to a second terminal through a first channel, the indication information being used to indicate whether there is a potential resource conflict on a target PSSCH resource or whether there is a detected resource conflict on the target PSSCH resource. A time-domain position of the first channel is related to a time-domain position of a first PSSCH resource, or the time-domain position of the first channel is related to a time-domain position of a second PSSCH resource. The first PSSCH resource is a PSSCH resource on which there is the potential resource conflict, and the second PSSCH resource is a PSSCH resource on which there is the detected resource conflict.

20 Claims, 13 Drawing Sheets start transmitting, by a first terminal, indication information to a second terminal through a first channel, the indication information being used to indicate whether there is a potential resource conflict on a target PSSCH resource or whether there is a detected resource conflict on the target PSSCH resource — 101 end

(56)                  References Cited

U.S. PATENT DOCUMENTS

| | | | |
|---|---|---|---|
| 2019/0215817 A1 | 7/2019 | Chae et al. | |
| 2021/0050953 A1* | 2/2021 | Park | H04L 1/1864 |
| 2021/0127413 A1* | 4/2021 | Lu | H04W 72/044 |
| 2021/0168790 A1 | 6/2021 | Li et al. | |
| 2022/0295504 A1* | 9/2022 | Lee | H04L 1/1887 |
| 2023/0217317 A1* | 7/2023 | Zhao | H04W 72/0446 |
| | | | 370/329 |
| 2023/0362739 A1 | 11/2023 | Zhao | |
| 2025/0274226 A1* | 8/2025 | Park | H04L 1/1864 |

FOREIGN PATENT DOCUMENTS

| | | |
|---|---|---|
| WO | 2018030791 A1 | 2/2018 |
| WO | 2020251719 A1 | 12/2020 |
| WO | 2021071216 A1 | 4/2021 |
| WO | 2021135853 A1 | 7/2021 |

OTHER PUBLICATIONS

NTT Docomo, Inc. "Resource allocation for reliability and latency enhancements," 3GPP TSG RAN WG1 #104, e-Meeting, R1-2101631, Jan. 19, 2021.

LG Electronics, "Discussion on inter-UE coordination for Mode 2 enhancements," 3GPP TSG RAN WG1 Meeting #104bis-e, e-Meeting, R1-2103379, Apr. 7, 2021.

Office Action and search report issued on Jul. 26, 2024 for Chinese Patent Application No. 202110897740.X and its English translation provided by Applicant's Foreign Counsel.

Qualcomm Incorporated:"Reliability and Latency Enhancements for Mode 2"; 3GPP TSG RAN WG1 Meeting #105-e; R1-2104694; May 10-27, 2021.

Apple: "On Inter-UE Coordination"; 3GPP TSG RAN WG1 #105-e; R1-2105127, May 10-27, 2021.

ETRI: "Discussion on inter-UE Coordination for Mode 2 Enhancements"; 3GPP TSG RAN WG1 Meeting #105-e; R1-2105229; e-Meeting, May 10-27, 2021.

International Search Report for International Patent Application No. PCT/CN2022/103851 issued by the International Patent Office on Oct. 8, 2022 and its English translation provided by WIPO.

Written Opinion for International Patent Application No. PCT/CN2022/103851 issued by the International Patent Office on Oct. 8, 2022 and its English translation provided by WIPO.

International Preliminary Report on Patentibility for International Patent Application No. PCT/CN2022/103851 issued by the International Patent Office on Feb. 6, 2024 and its English translation provided by WIPO.

3GPP TSG RAN WG1 Meeting #105-e, R1-2105205, e-Meeting, May 19-27, 2021, Agenda Item: 8.11.1.2 Source: LG Electronics, Title: "Discussion on inter-UE coordination for Mode 2 enhancements".

* cited by examiner

INFORMATION PROCESSING METHOD, TERMINAL, AND READABLE STORAGE MEDIUM

CROSS-REFERENCE TO RELATED APPLICATIONS

This application is a U.S. national phase of PCT Application No. PCT/CN2022/103851 filed on Jul. 5, 2022, which claims priority to a Chinese Patent Application No. 202110897740.X filed in China on Aug. 5, 2021, the disclosures of which are incorporated herein by reference in their entireties.

TECHNICAL FIELD

The present disclosure relates to the field of communication technology, in particular to an information processing method, a terminal, and a readable storage medium.

BACKGROUND

In a $5^{th}$-Generation New Radio (NR) Vehicle-to-Everything (V2X) system, direct communication is performed between terminals on a Sidelink. Before the transmission of service data, at first it is necessary to determine time/frequency resources used for the Sidelink data transmission. A main principle of determining the time/frequency resources lies in preventing the occurrence of any collision between the time/frequency resources used by different terminals, so as to prevent the occurrence of mutual interference.

In the NR V2X, there are two resource scheduling modes, i.e., a resource allocation mode 1 (Mode 1) in which the time/frequency resources used in the Sidelink communication between the terminals is uniformly scheduled by a base station, and a resource allocation mode 2 (Mode 2) in which the base station does not participate in the scheduling and the terminal selects, on its own initiative, the time/frequency resources used in the Sidelink communication between the terminals.

In the NR-V2X Mode 2, distributed resource scheduling is used. The base station does not schedule the resources uniformly, so the terminal needs to determine a resource occupation condition of the other terminal through a resource sensing mechanism, and select the resource in accordance with a resource sensing result. As compared with a completely random resource selection mechanism, through the resource sensing mechanism, it is able to improve a resource utilization rate, reduce a collision probability, and improve the system performance.

In the related art, in the resource allocation mode 2, the terminal performs resource exclusion in accordance with its own resource sensing result, i.e., excludes conflict resources sensed by itself. However, in the related art, the terminal determines the conflict resources only in accordance with its own sensing result, so a transmission success rate of Sidelink data packets is adversely affected.

SUMMARY

An object of the present disclosure is to provide an information processing method, a terminal, and a readable storage medium, so as to improve a transmission success rate of Sidelink data packets.

In one aspect, the present disclosure provides in some embodiments an information processing method, including transmitting, by a first terminal, indication information to a second terminal through a first channel, the indication information being used to indicate whether there is a potential resource conflict on a target Physical Sidelink Shared Channel (PSSCH) resource or whether there is a detected resource conflict on the target PSSCH resource. A time-domain position of the first channel is related to a time-domain position of a first PSSCH resource, or the time-domain position of the first channel is related to a time-domain position of a second PSSCH resource, the first PSSCH resource is a PSSCH resource on which there is the potential resource conflict, and the second PSSCH resource is a PSSCH resource on which there is the detected resource conflict.

In addition, the time-domain position of the first channel is related to a time-domain position where Sidelink Control Information (SCI) of the first PSSCH resource is located, or the time-domain position of the first channel is related to a time-domain position where SCI of the second PSSCH resource is located.

In addition, the first channel is a sequence-based second channel, or the first channel is a Type2 Physical Sidelink Feedback Channel (PSFCH), or the first channel is a PSFCH.

In addition, the transmitting, by the first terminal, the indication information to the second terminal through the first channel includes transmitting, by the first terminal, the indication information to the second terminal through the first channel in accordance with a predetermined period, and the period is equal to n0 slots, where n0=1, 2 or 4.

In addition, the transmitting, by the first terminal, the indication information to the second terminal through the first channel includes transmitting, by the first terminal, the indication information to the second terminal through the first channel within a first slot, and the first slot is an Nth slot before a slot where the first PSSCH resource is located, or the first slot is determined in accordance with a slot where a transmission occasion of a latest PSFCH before the first PSSCH resource is located, where N is an integer greater than or equal to 0.

In addition, the first slot being determined in accordance with the slot where the transmission occasion of the latest PSFCH before the first PSSCH resource is located comprises, the first slot is the slot where the transmission occasion of the latest PSFCH before the first PSSCH resource is located; or the first slot is a $(K1+n1)^{th}$ slot or a $(K1-n1)^{th}$ slot, and the slot where the transmission occasion of the latest PSFCH before the first PSSCH resource is located is a $(K1)^{th}$ slot, where K1 and n1 are both integers greater than or equal to 0.

In addition, the transmitting, by the first terminal, the indication information to the second terminal through the first channel includes transmitting, by the first terminal, the indication information to the second terminal through the first channel within a first slot, and the first slot is an $M^{th}$ slot after a slot where the second PSSCH resource is located, or the first slot is determined in accordance with a slot where a transmission occasion of a latest PSFCH after the second PSSCH resource is located, where M is an integer greater than or equal to 0.

In addition, the first slot being determined in accordance with the slot where the transmission occasion of the latest PSFCH after the second PSSCH resource is located comprises, the first slot is the slot where the transmission occasion of the latest PSFCH after the second PSSCH resource is located; or the first slot is a $(K2+n2)^{th}$ slot or a $(K2-n2)^{th}$ slot, and the slot where the transmission occasion of the latest PSFCH after the second PSSCH resource is located is a $(K2)^{th}$ slot, where K2 and n2 are both integers greater than or equal to 0.

In addition, a minimum time interval between the time-domain position of the first channel and the first PSSCH resource is determined in accordance with a terminal processing delay budget, or a minimum time interval between the time-domain position of the first channel and the second PSSCH resource is determined by the terminal processing delay budget.

In addition, prior to transmitting, by the first terminal, the indication information to the second terminal through the first channel, the information processing method further includes determining whether the first channel has been configured into a target resource pool, and the transmitting, by the first terminal, the indication information to the second terminal through the first channel includes, when determining that the first channel has been configured into the target resource pool, transmitting, by the first terminal, the indication information to the second terminal through the first channel.

In addition, the quantity of Resource Blocks (RBs) in a candidate resource set for the first channel in the target resource pool is determined in accordance with the quantity of sub-channels in the target resource pool and a period for transmitting the indication information through the first channel.

In addition, the candidate resource set is determined through one or more of the followings: obtaining the candidate resource set in accordance with a slot number of a PSSCH associated with the first channel and a number of a start sub-channel occupied by the transmission of the PSSCH; or obtaining the candidate resource set in accordance with the slot number of the PSSCH associated with the first channel and numbers of all sub-channels occupied by the transmission of the PSSCH.

In another aspect, the present disclosure provides in some embodiments an information processing method, including: receiving, by a second terminal, indication information through a first channel, the indication information being used to indicate whether there is a potential resource conflict on a target PSSCH resource or whether there is a detected resource conflict on the target PSSCH resource; and selecting, by the second terminal, a transmission resource in accordance with the indication information. A time-domain position of the first channel is related to a time-domain position of a first PSSCH resource, or the time-domain position of the first channel is related to a time-domain position of a second PSSCH resource, the first PSSCH resource is a PSSCH resource on which there is the potential resource conflict, and the second PSSCH resource is a PSSCH resource on which there is the detected resource conflict.

In yet another aspect, the present disclosure provides in some embodiments a first terminal, including a memory, a transceiver and a processor. The memory is configured to store therein a computer program, the transceiver is configured to receive and transmit data under the control of the processor, the processor is configured to read the computer program in the memory to transmit indication information to a second terminal through a first channel, and the indication information is used to indicate whether there is a potential resource conflict on a target Physical Sidelink Shared Channel (PSSCH) resource or whether there is a detected resource conflict on the target PSSCH resource. A time-domain position of the first channel is related to a time-domain position of a first PSSCH resource, or the time-domain position of the first channel is related to a time-domain position of a second PSSCH resource, the first PSSCH resource is a PSSCH resource on which there is the potential resource conflict, and the second PSSCH resource is a PSSCH resource on which there is the detected resource conflict.

In addition, the time-domain position of the first channel is related to a time-domain position where SCI of the first PSSCH resource is located, or the time-domain position of the first channel is related to a time-domain position where SCI of the second PSSCH resource is located.

In addition, the first channel is a sequence-based second channel, or the first channel is a Type2 PSFCH, or the first channel is a PSFCH.

In still yet another aspect, the present disclosure provides in some embodiments a second terminal, including a memory, a transceiver and a processor. The memory is configured to store therein a computer program, and the transceiver is configured to receive and transmit data under the control of the processor. The processor is configured to read the computer program in the memory to: receive indication information through a first channel, the indication information being used to indicate whether there is a potential resource conflict on a target PSSCH resource or whether there is a detected resource conflict on the target PSSCH resource; and select a transmission resource in accordance with the indication information. A time-domain position of the first channel is related to a time-domain position of a first PSSCH resource, or the time-domain position of the first channel is related to a time-domain position of a second PSSCH resource, the first PSSCH resource is a PSSCH resource on which there is the potential resource conflict, and the second PSSCH resource is a PSSCH resource on which there is the detected resource conflict.

In still yet another aspect, the present disclosure provides in some embodiments a first terminal, including a first transmission unit configured to transmit indication information to a second terminal through a first channel, the indication information being used to indicate whether there is a potential resource conflict on a target PSSCH resource or whether there is a detected resource conflict on the target PSSCH resource. A time-domain position of the first channel is related to a time-domain position of a first PSSCH resource, or the time-domain position of the first channel is related to a time-domain position of a second PSSCH resource, the first PSSCH resource is a PSSCH resource on which there is the potential resource conflict, and the second PSSCH resource is a PSSCH resource on which there is the detected resource conflict.

In still yet another aspect, the present disclosure provides in some embodiments a second terminal, including: a first reception unit configured to receive indication information through a first channel, the indication information being used to indicate whether there is a potential resource conflict on a target PSSCH resource or whether there is a detected resource conflict on the target PSSCH resource; and a first processing unit configured to select a transmission resource in accordance with the indication information. A time-domain position of the first channel is related to a time-domain position of a first PSSCH resource, or the time-domain position of the first channel is related to a time-domain position of a second PSSCH resource, the first PSSCH resource is a PSSCH resource on which there is the potential resource conflict, and the second PSSCH resource is a PSSCH resource on which there is the detected resource conflict.

In still yet another aspect, the present disclosure provides in some embodiments a processor-readable storage medium storing therein a computer program. The computer program is used to be executed by a processor to implement the above-mentioned information processing method.

According to the embodiments of the present disclosure, the first terminal transmits the indication information to the second terminal through the first channel, and the indication information is used to indicate whether there is the potential resource conflict on the target PSSCH resource or there is the detected resource conflict on the target PSSCH resource. Accordingly, apart from a resource conflict sensed by the second terminal itself, a content in the indication information is further taken into consideration when the second terminal selects the resource. As a result, it is able to reduce a probability of data packet transmission failures due to a resource collision, thereby to improve a transmission success rate of a Sidelink data packet.

BRIEF DESCRIPTION OF THE DRAWINGS

FIG. 2(*b*) is another schematic view showing the channel multiplexing according to an embodiment of the present disclosure;

FIG. 3(*b*) is another schematic view showing the channel configuration according to an embodiment of the present disclosure;

FIG. 4(*b*) is another schematic view showing the signal transmission according to an embodiment of the present disclosure;

FIG. 5(*b*) is still yet another schematic view showing the signal transmission according to an embodiment of the present disclosure;

FIG. 6(*b*) is still yet another schematic view showing the signal transmission according to an embodiment of the present disclosure;

DETAILED DESCRIPTION

The expression "and/or" in the embodiments of the present disclosure may be merely used to describe the relationship between objects, and it may include three relationships. For example, "A and/or B" may represent that, there is only A, there are both A and B, and there is only B. Further, the symbol "/" usually refers to "or".

The expression "a plurality of" refers to two or more, and the other quantifiers are similar.

The present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

An object of the present disclosure is to provide an information processing method, a terminal, and a readable storage medium, so as to improve a transmission success rate of Sidelink data packets. The method and the device are provided on the basis of a same inventive concept, and a principle of the method for solving the problem is similar to that of the device, so the implementation of the device may refer to that of the method and will not be further particularly defined.

Figure 1:
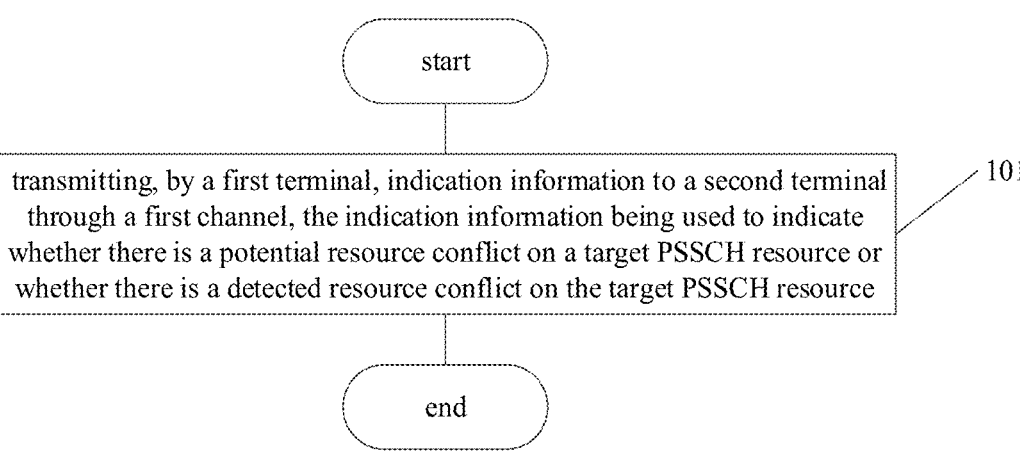
FIG. 1 is a flow chart of an information processing method according to an embodiment of the present disclosure.

As shown in FIG. 1, the present disclosure provides in some embodiments an information processing method, which includes Step 101 of transmitting, by a first terminal, indication information to a second terminal through a first channel, the indication information being used to indicate whether there is a potential resource conflict on a target PSSCH resource or whether there is a detected resource conflict on the target PSSCH resource. A time-domain position of the first channel is related to a time-domain position of a first PSSCH resource, or the time-domain position of the first channel is related to a time-domain position of a second PSSCH resource, the first PSSCH resource is a PSSCH resource on which there is the potential resource conflict, and the second PSSCH resource is a PSSCH resource on which there is the detected resource conflict.

In the embodiments of the present disclosure, types of the resource conflict include that there is the potential (or expected) resource conflict and that there is the detected resource conflict. When there is the potential resource conflict, it means that there is probably a conflict on a resource, or a probability of the conflict is greater than a predetermined value. When there is the detected resource conflict, it means that there is indeed a conflict on the resource.

When the time-domain position of the first channel is related to the time-domain position of the first PSSCH resource, it may be understood as that the time-domain position of the first channel is determined in accordance with the time-domain position of the first PSSCH resource. Similarly, when the time-domain position of the first channel is related to the time-domain position of the second PSSCH resource, it may be understood as that the time-domain position of the first channel is determined in accordance with the time-domain position of the second PSSCH resource.

To be specific, the time-domain position of the first channel is related to a time-domain position where SCI of the first PSSCH resource is located, or the time-domain position of the first channel is related to a time-domain position where SCI of the second PSSCH resource is located.

In the embodiments of the present disclosure, the first channel is a sequence-based second channel, or the first channel is a Type2 PSFCH, or the first channel is a PSFCH. The second channel is, for example, a Physical Sidelink Resource Conflict Indication Channel (PSRCH). As a new channel, the PSRCH is configured independently of the PSFCH in the related art. The Type2 PSFCH is different from the PSFCH in the related art, and it is configured to carry indication information. In actual use, different time-domain/frequency-domain resources, different sequences or different Cyclic Shift (CS) values are used to indicate whether the PSFCH is used for the feedback of a Hybrid Automatic Repeat Request (HARQ) Acknowledgement (ACK)/Negative Acknowledgement (NACK), or the feedback of resource conflict information (i.e., the indication information).

Figure 2:
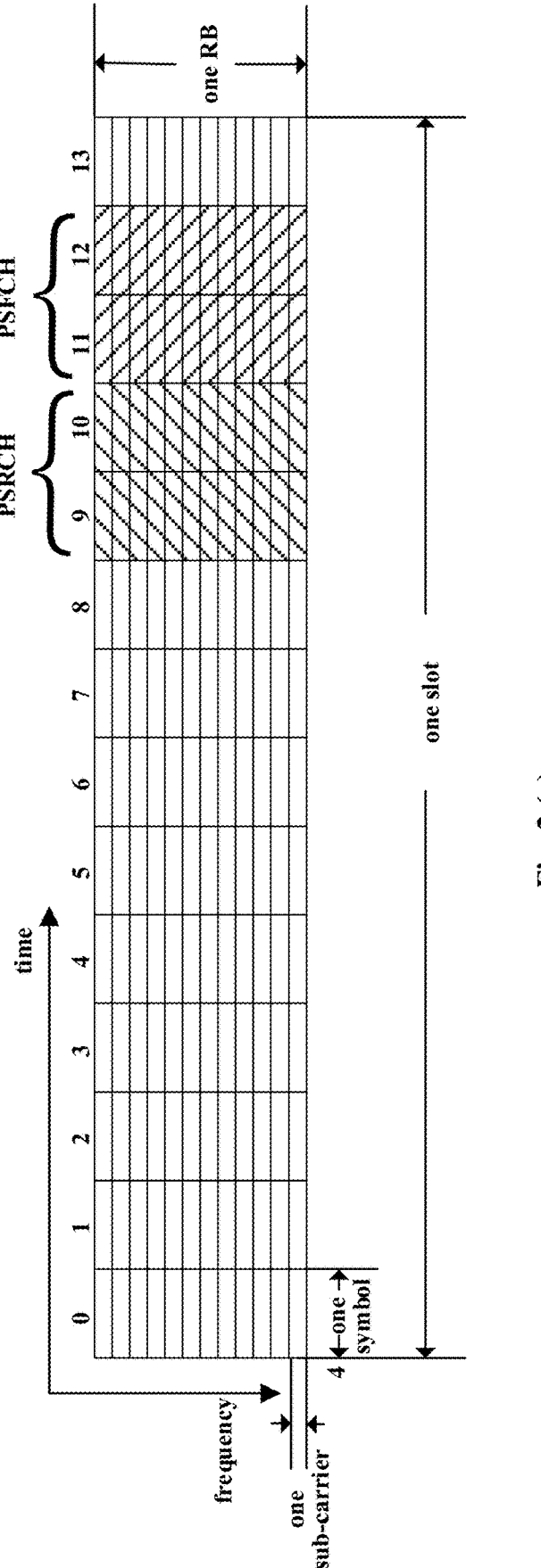
FIG. 2(*a*) is a schematic view showing channel multiplexing according to an embodiment of the present disclosure.
Figure 2:
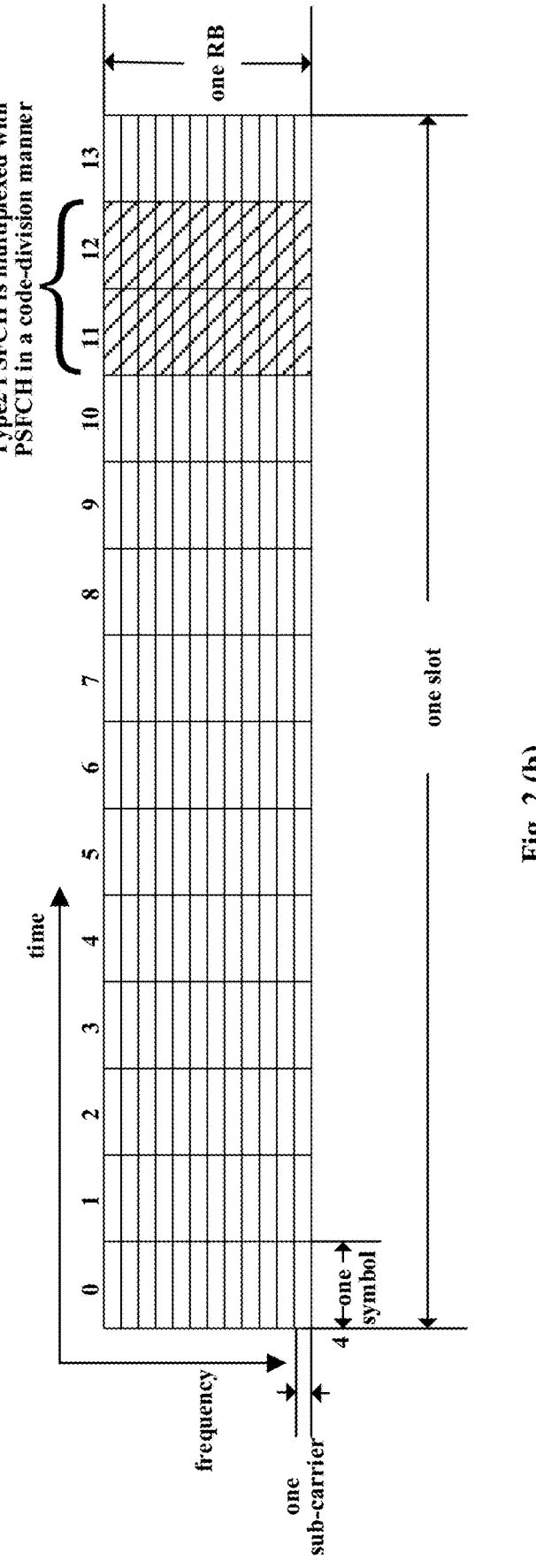

As shown in FIG. 2(a), the PSRCH and the PSFCH are multiplexed in a time-division manner and occupy different time-domain resources, e.g., the PSRCH occupies symbols #9 and #10, and the PSFCH occupies symbols #11 and #12, so it is able to prevent the conflict in the resources used by the PSRCH and the PSFCH. In addition, the PSRCH and the PSFCH are located in a same frequency-domain resource.

As shown in FIG. 2(b), the first terminal simultaneously transmits the Type2 PSFCH and the PSFCH within slots #11 and #12 of an RB occupied by the first terminal. The two types of channels together occupy 12 subcarriers of one RB and two slots, and the slot #11 is a complete repetition of the slot #12. At this time, the Type2 PSFCH and the PSFCH are multiplexed in a code-division manner, and they are differentiated from each other through different sequences of different CSs values. On the RB, a sequence having a length of 12 is placed on the 12 subcarriers of the RB, and the CS value of the sequence has candidate values of {1, 2, 3, 6}, so as to accommodate more PSFCH channels. When different types of PSFCH channels use a same sequence, CS #1 is used to indicate the PSFCH and CS #2 is used to indicate the Type2 PSFCH. When different types of PSFCH channels use different sequences, sequence #1 may be used to indicate the PSFCH, and sequence #2 may be used to indicate the Type2 PSFCH.

A frequency-domain position of the first channel is determined as follows. (1) The frequency-domain position of the first channel is (pre) configured, i.e., a specific position of the first channel in a frequency domain is determined through relevant configuration signaling. (2) The frequency-domain position of the first channel is fixed, i.e., a frequency resource is predefined and dedicated for the transmission of the first channel rather than the other information.

To be specific, in the embodiments of the present disclosure, the first terminal transmits the indication information to the second terminal through the first channel in accordance with a predetermined period. The period may be configured through Radio Resource Control (RRC) signaling, and it is equal to n0 slots, where n0=1, 2 or 4.

Whether the first channel is configured in a resource pool is controlled through a resource conflict information enable switch in the SCI or RRC signaling. The RRC signaling includes PC5 RRC signaling or NR Uu RRC signaling. When the period for the first channel of the first terminal is configured by the other terminal, the period is configured through the PC5 RRC signaling, and when the period for the first channel of the first terminal is configured by a base station, it is configured through the NR Uu RRC signaling.

Figure 3:
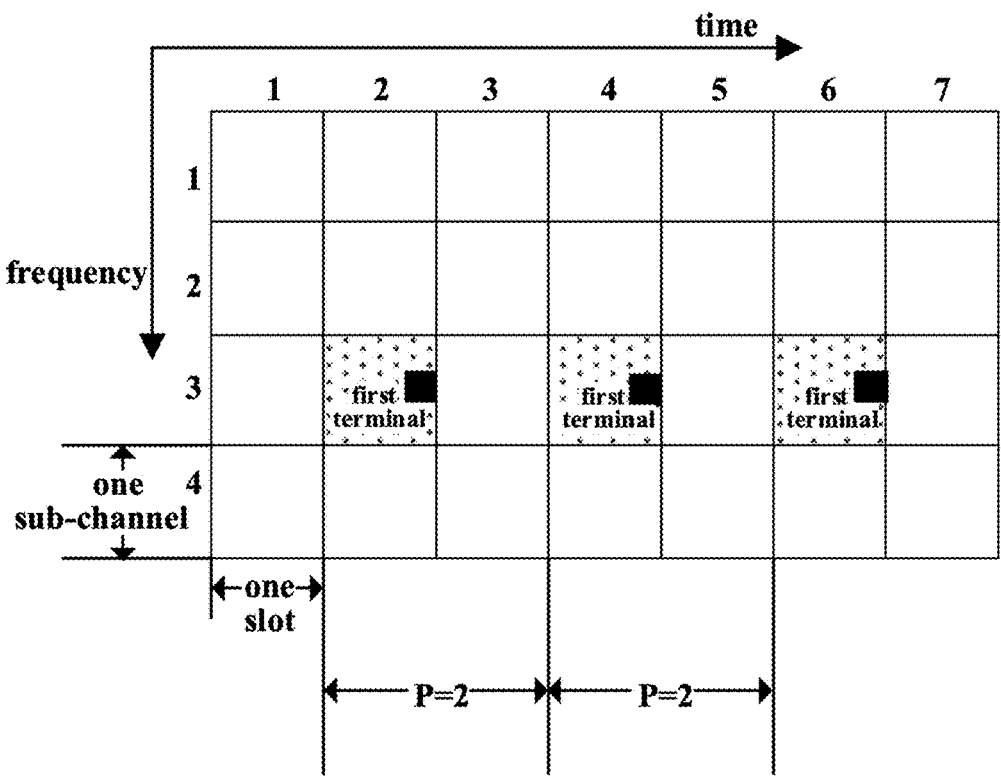
FIG. 3(*a*) is a schematic view showing channel configuration according to an embodiment of the present disclosure.
Figure 3:
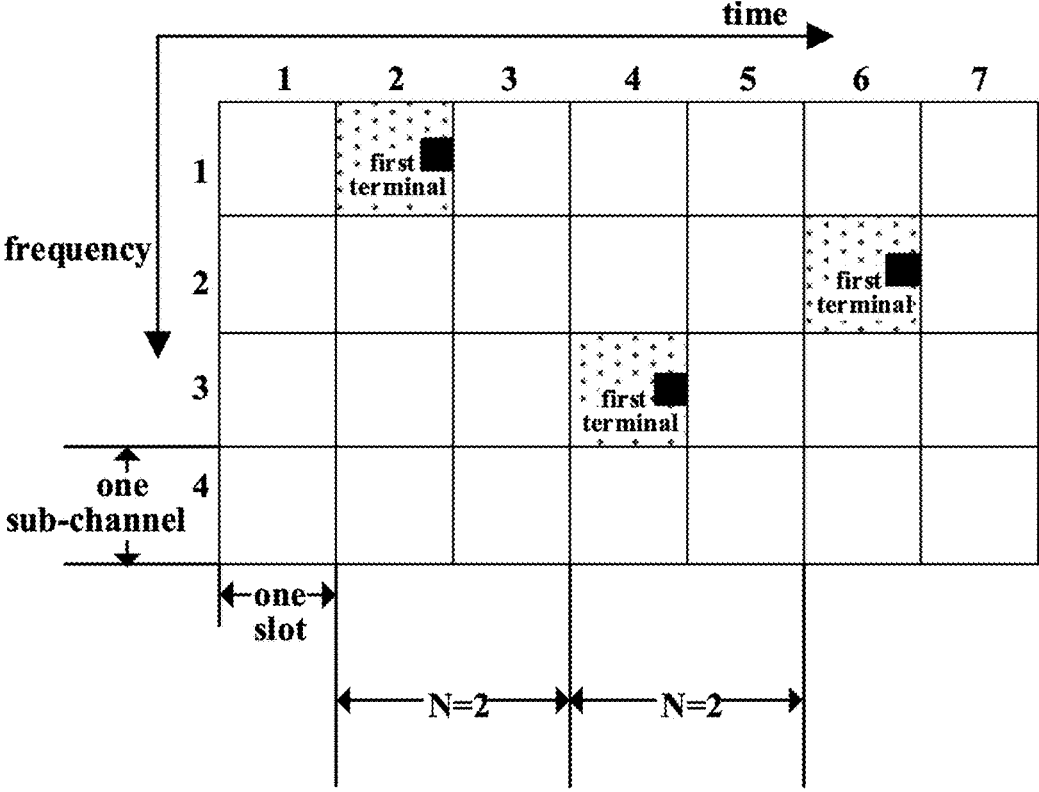

Sub-channel is a frequency-domain unit for Sidelink resource allocation, and one sub-channel consists of one or more consecutive Physical Resource Blocks (PRBs) in the frequency domain. As shown in FIG. 3(a), the period of the first channel is configured as P=2 slots, and a plurality of instances of the first channel are located in a same sub-channel. As shown in FIG. 3(b), the period of the first channel is configured as P=2 slots, and a plurality of instances of the first channel are located in different sub-channels. Through periodically transmitting the first channel, it is able to reduce the configuration complexity of the first channel.

In the embodiments of the present disclosure, the indication information may be transmitted in one or more of the following ways.

(1) When the type of the resource conflict is the expected/potential resource conflict, the first terminal transmits the indication information to the second terminal through the first channel within a first slot. The first slot is an $N^{th}$ slot before a slot where the first PSSCH resource is located, or the first slot is determined in accordance with a slot where a transmission occasion of a latest PSFCH before the first PSSCH resource is located, where N is an integer greater than or equal to 0.

In this case, when the first slot is determined in accordance with the slot where the transmission occasion of the latest PSFCH before the first PSSCH resource is located, it means that the first slot is the slot where the transmission occasion of the latest PSFCH before the first PSSCH resource is located; or the first slot is a $(K1+n1)^{th}$ slot or a $(K1-n1)^{th}$ slot, and the slot where the transmission occasion of the latest PSFCH before the first PSSCH resource is located is a $(K1)^{th}$ slot, where K1 and n1 are both integers greater than or equal to 0.

(2) When the type of the resource conflict is the detected resource conflict, the first terminal transmits the indication information to the second terminal through the first channel within a first slot. The first slot is an $M^{th}$ slot after a slot where the second PSSCH resource is located, or the first slot is determined in accordance with a slot where a transmission occasion of a latest PSFCH after the second PSSCH resource is located, where M is an integer greater than or equal to 0.

In this case, when the first slot is determined in accordance with the slot where the transmission occasion of the latest PSFCH after the second PSSCH resource is located, it means that the first slot is the slot where the transmission occasion of the latest PSFCH after the second PSSCH resource is located; or the first slot is a $(K2+n2)^{th}$ slot or a $(K2-n2)^{th}$ slot, and the slot where the transmission occasion of the latest PSFCH after the second PSSCH resource is located is a $(K2)^{th}$ slot, where K2 and n2 are both integers greater than or equal to 0.

In the above-mentioned two cases, a time-domain transmission position of the first channel may be further indicated in an implicit manner. For example, a time-domain position offset of the first channel may be determined in accordance with a reference T. When the type of the resource conflict is the expected/potential resource conflict, T represents N, and when the type of the resource conflict is the detected resource conflict, T represents M.

Figure 4:
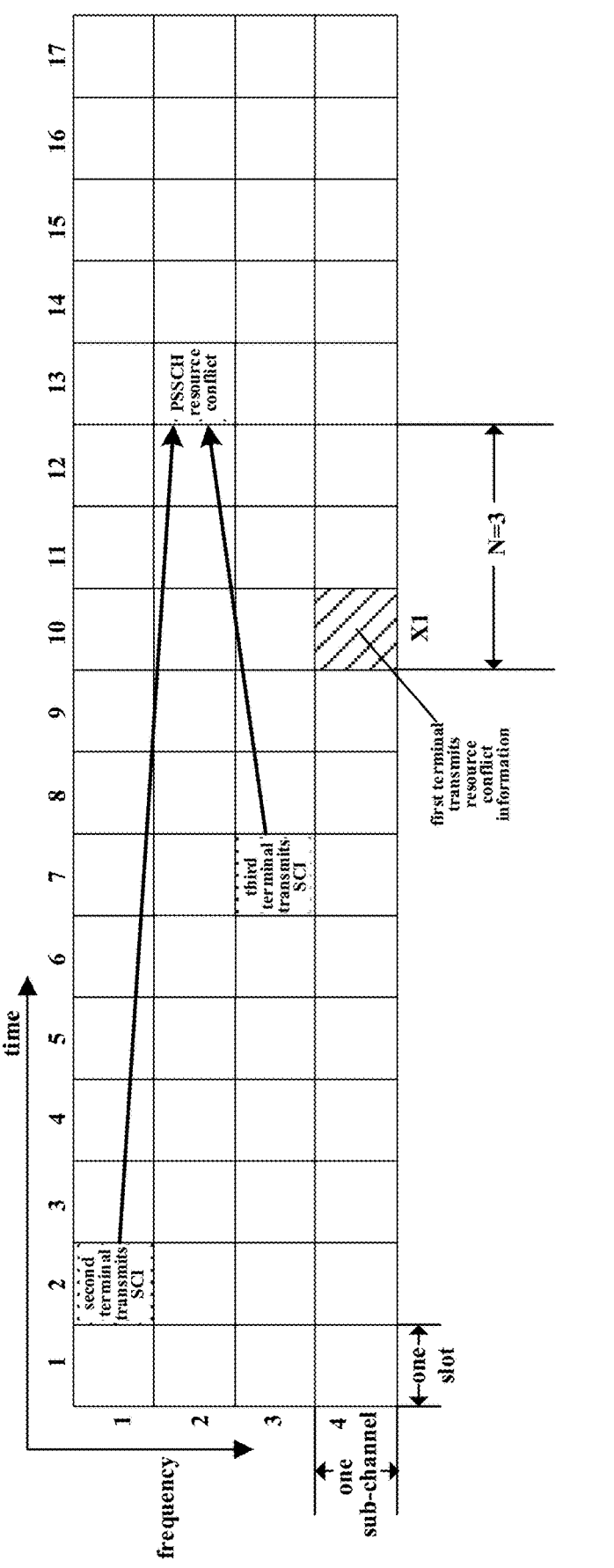
FIG. 4(*a*) is a schematic view showing signal transmission according to an embodiment of the present disclosure.
Figure 4:
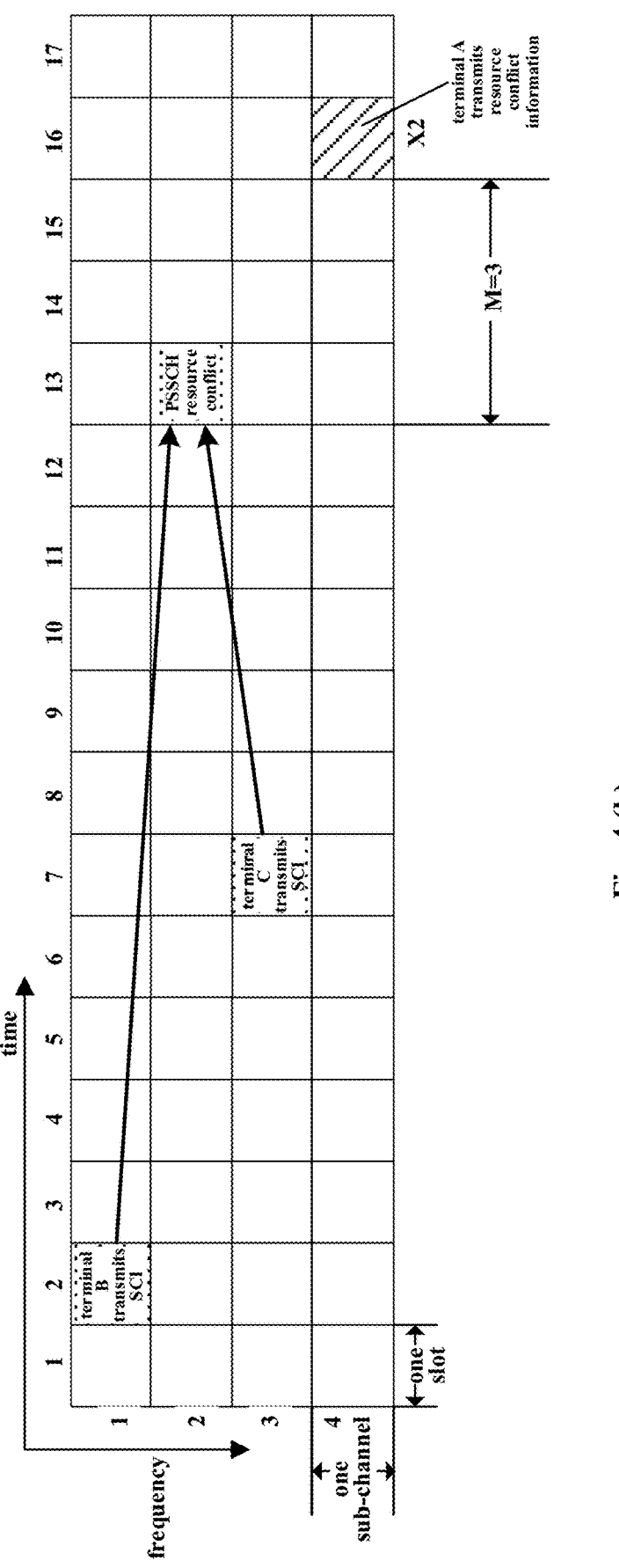

As shown in FIGS. 4(a) and 4(b), the second terminal transmits SCI within a slot #2 on a sub-channel #1, and a third terminal transmits SCI within a slot #7 on a sub-channel #3. The two pieces of SCI indicate that resources within a slot #13 on a sub-channel #2 are used by each of the second terminal and the third terminal for data transmission, so a resource conflict occurs.

As shown in FIG. 4(a), when the first terminal has monitored the SCI from the second terminal and the third terminal before the occurrence of the resource conflict so as to obtain the information about the expected/potential resource conflict, the first terminal transmits the information about the resource conflict to the second terminal through the first channel within a slot #10 on a sub-channel #4. At this time, the second terminal changes the transmission resource, so as to prevent the occurrence of the resource conflict. In the case of the expected/potential resource conflict in FIG. 4(a), an occasion where the first terminal transmits the first channel is a first slot X1, and the first slot X1 is an $N^{th}$ slot (N=3) before a slot where a conflict resource is located.

As shown in FIG. 4(b), when the first terminal has monitored the SCI from the second terminal and the third terminal after the occurrence of the resource conflict so as to obtain the information about the detected resource conflict, the first terminal transmits the information about the resource conflict to the second terminal through the first channel within a slot #16 on the sub-channel #4. At this time, the second terminal performs retransmission so as to prevent the occurrence of data packet loss. In the case of the detected resource conflict in FIG. 4(b), an occasion where the first terminal transmits the first channel is a first slot X2, and the first slot X2 is an $M^{th}$ slot (N=3) after the slot where the conflict resource is located.

Through the above timing method of the first channel, the time-domain position of the first channel is directly and effectively determined with the time-domain position of the PSSCH resource where there is the resource conflict as a reference, or with the time-domain position of the SCI of the PSSCH resource where there is the resource conflict as a reference.

Figure 5:
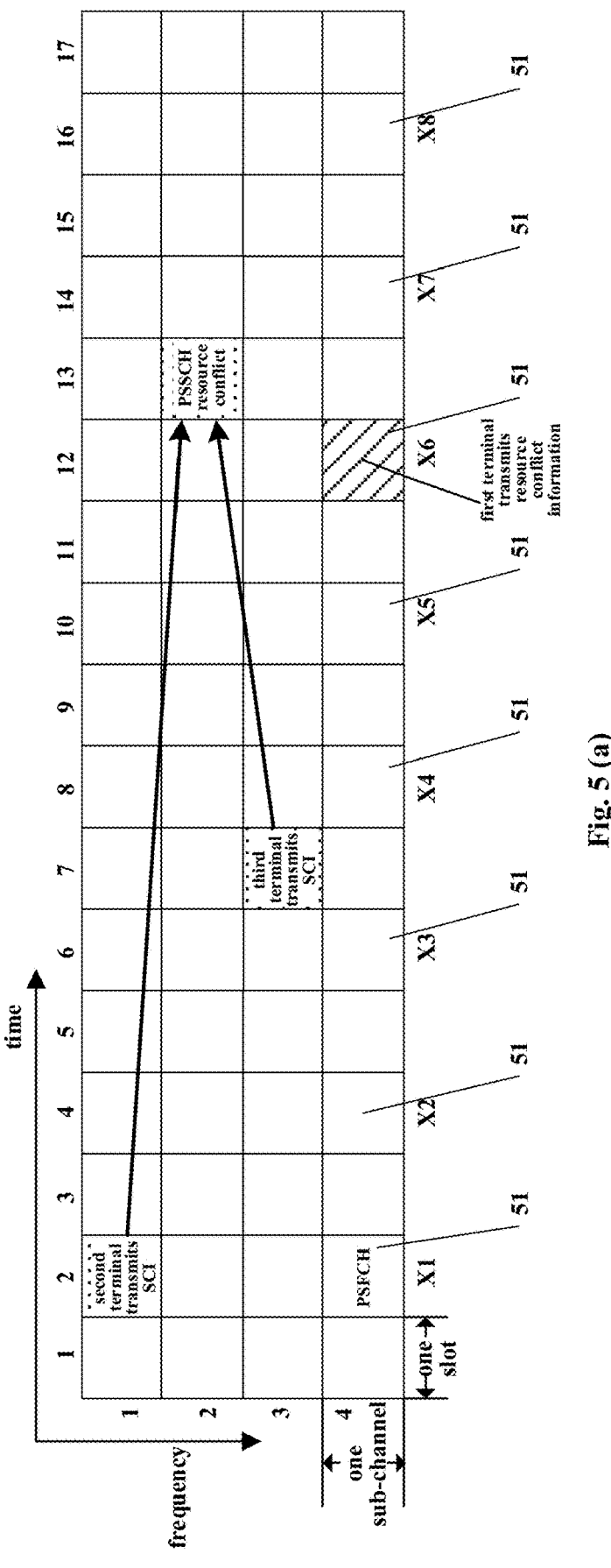
FIG. 5(*a*) is yet another schematic view showing the signal transmission according to an embodiment of the present disclosure.
Figure 5:
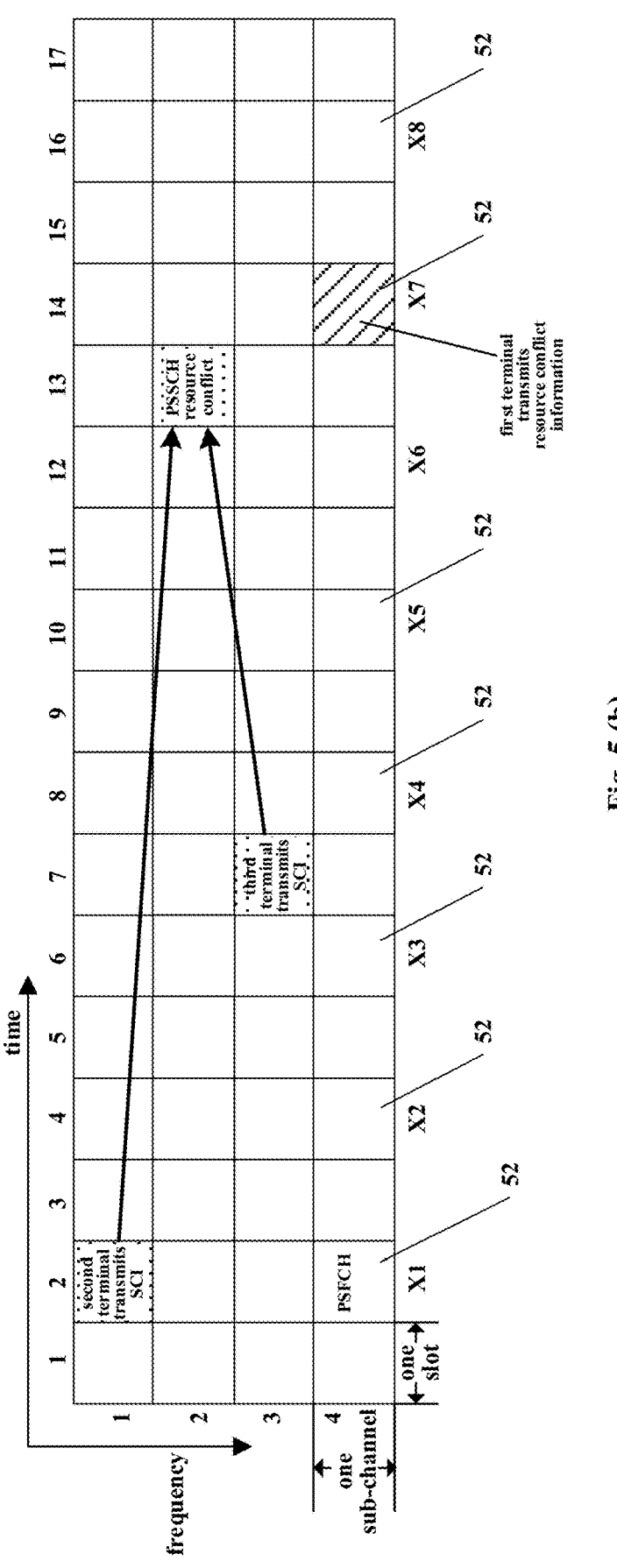

As shown in FIGS. 5(a) and 5(b), the second terminal transmits SCI within a slot #2 on a sub-channel #1, and the third terminal transmits SCI within a slot #7 on a sub-channel #3. The two pieces of SCI indicate that resources within a slot #13 on a sub-channel #2 are used by each of the second terminal and the third terminal for data transmission, so a resource conflict occurs. The first terminal transmits the PSFCH periodically on a sub-channel #4, as indicated by 51 or 52 in FIGS. 5(a) and 5(b).

As shown in FIG. 5(a), when the first terminal has monitored the SCI from the second terminal and the third terminal before the occurrence of the resource conflict so as to obtain the information about the expected/potential resource conflict, the first terminal transmits coordination information through the first channel within a first slot, and the first slot is just a slot where a latest PSFCH occasion before a resource having the expected/potential resource conflict is located. In this way, the first terminal transmits the information about the resource conflict to the second terminal through the first channel within a slot #12 on a sub-channel #4. At this time, the second terminal changes the transmission resource, so as to prevent the occurrence of the resource conflict. In the case of the expected/potential resource conflict in FIG. 5(a), an occasion where the first terminal transmits the first channel is a first slot X6.

As shown in FIG. 5(b), when the first terminal has monitored the SCI from the second terminal and the third terminal after the occurrence of the resource conflict so as to obtain the information about the detected resource conflict, the first terminal transmits the coordination information through the first channel resource within a first slot, and the first slot is just a slot where a latest PSFCH occasion after a resource having the detected resource conflict is located. In this way, the first terminal transmits the information about the resource conflict through the first channel to the second terminal within a slot #14 on a sub-channel #4. At this time, the second terminal performs retransmission so as to prevent the occurrence of data packet loss. In the case of the detected resource conflict in FIG. 5(b), an occasion where the first terminal transmits the first channel is a first slot X7.

Through the above timing method of the first channel, the time-domain position of the first channel is determined with the time-domain position of the PSSCH resource where there is the resource conflict as a reference, or with the time-domain position of the SCI of the PSSCH resource where there is the resource conflict as a reference, and the first channel shares the slot with the PSFCH. As a result, it is able to save the time-domain resources, and prevent the occurrence of a collision between the first channel and the PSFCH.

Figure 6:
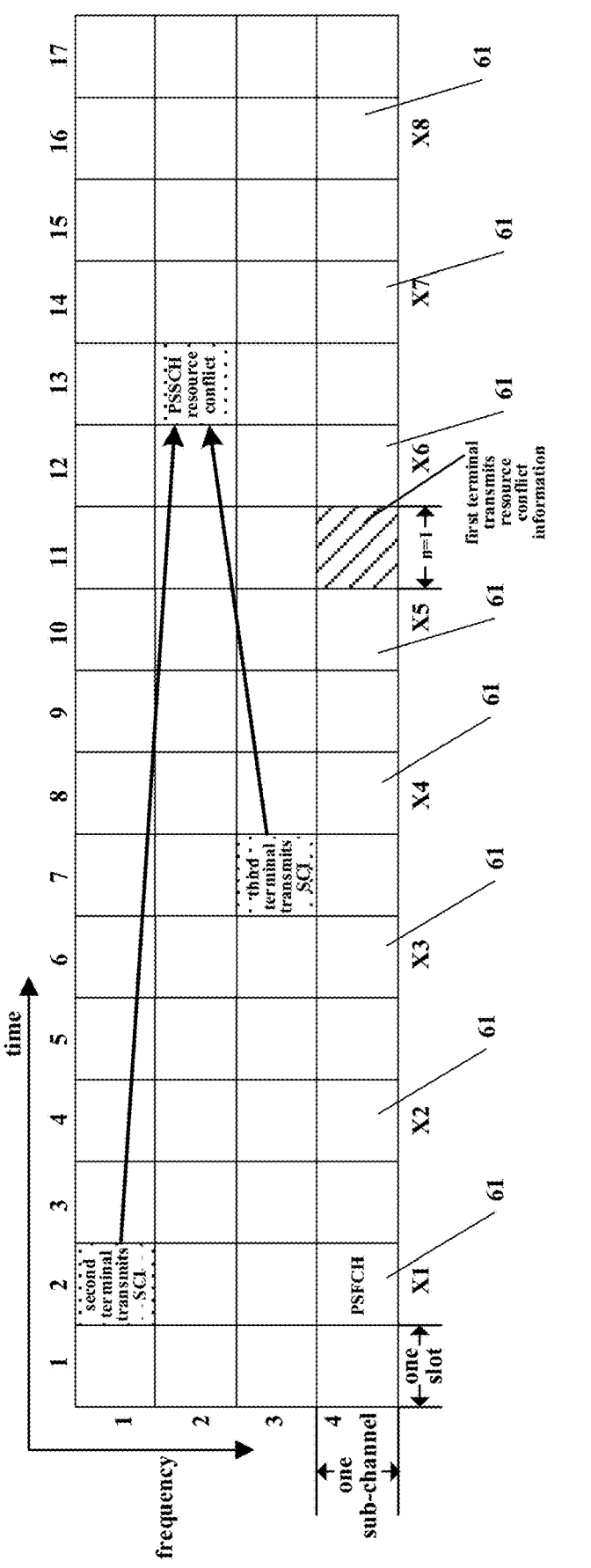
FIG. 6(*a*) is still yet another schematic view showing the signal transmission according to an embodiment of the present disclosure.
Figure 6:
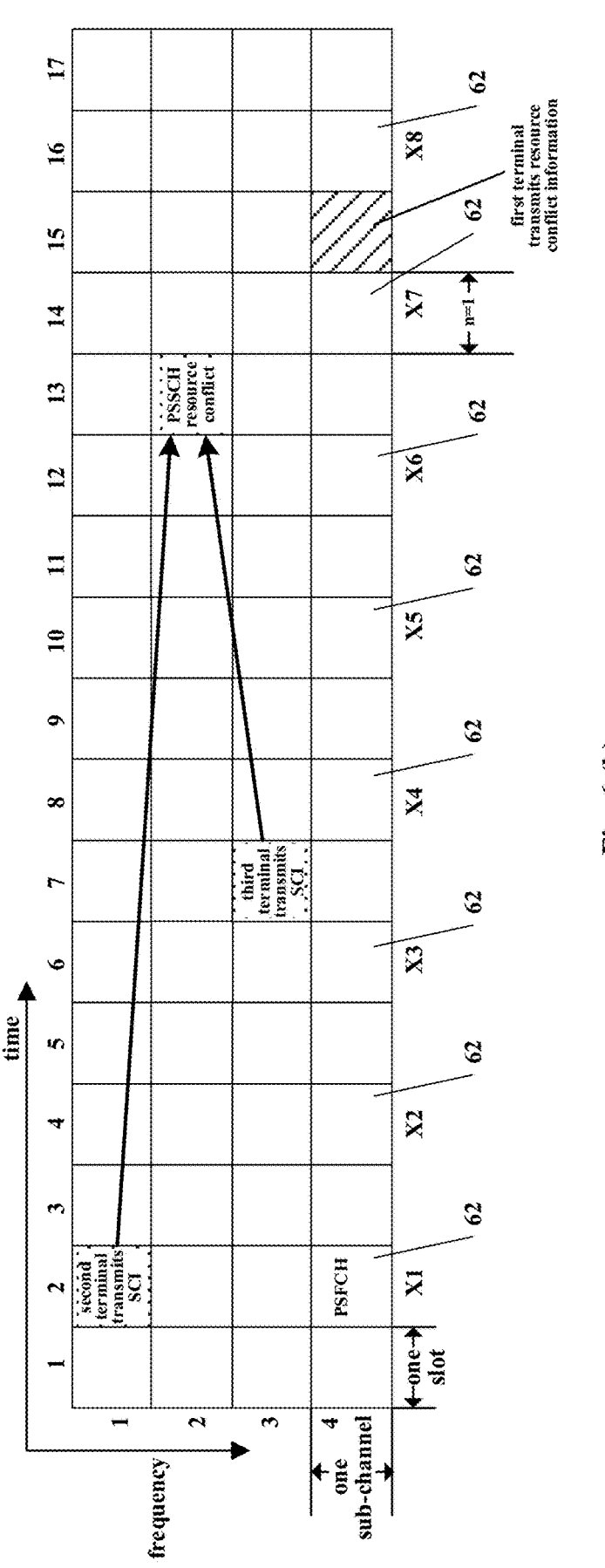

As shown in FIGS. 6(a) and 6(b), the second terminal transmits SCI within a slot #2 on a sub-channel #1, and the third terminal transmits SCI within a slot #7 on a sub-channel #3. The two pieces of SCI each indicate that resources within a slot #13 on a sub-channel #2 are used by the second terminal and the third terminal for data transmission, so a resource conflict occurs. The first terminal transmits the PSFCH periodically on a sub-channel #4, as indicated by 61 or 62 in FIGS. 6(a) and 6(b).

As shown in FIG. 6(a), when the first terminal has monitored the SCI from the second terminal and the third terminal before the occurrence of the resource conflict so as to obtain the information about the expected/potential resource conflict, the first terminal transmits coordination information through the first channel within a first slot. When a latest PSFCH occasion before the resource having the expected/potential resource conflict is within a $K^{th}$ slot, the first channel resource is within a $(K-n)^{th}$ slot. When n=1, the first terminal transmits the information about the resource conflict to the second terminal through the first channel within a slot #11 on a sub-channel #4. At this time, the second terminal changes the transmission resource, so as to prevent the occurrence of the resource conflict. In the case of the expected/potential resource conflict in FIG. 6(a), an occasion where the first terminal transmits the first channel is the slot #11.

As shown in FIG. 6(b), when the first terminal has monitored the SCI from the second terminal and the third terminal after the occurrence of the resource conflict so as to obtain the information about the detected resource conflict, the first terminal transmits the coordination information through the first channel within a first slot. When a latest PSFCH occasion after the resource having the detected resource conflict is within a $K^{th}$ slot, the first channel resource is within a $(K+n)^{th}$ slot. When n=1, the first terminal transmits the information about the resource conflict to the second terminal through the first channel within a slot #15 on the sub-channel #4. At this time, the second terminal may perform retransmission so as to prevent the occurrence of data packet loss. In the case of the detected resource conflict in FIG. 6(b), an occasion where the first terminal transmits the first channel is the slot #15.

Through the above timing method of the first channel, the time-domain position of the first channel is determined with the time-domain position of the PSSCH resource where there is the resource conflict as a reference, or with the time-domain position of the SCI of the PSSCH resource where there is the resource conflict as a reference, and the first channel is associated with the PSFCH, so it is able to prevent the occurrence of a collision between the first channel and the PSFCH.

A minimum time interval between the time-domain position of the first channel and the first PSSCH resource is determined in accordance with a terminal processing delay budget (T3 or $T_{proc,1}$), or a minimum time interval between the time-domain position of the first channel and the second PSSCH resource is determined by the terminal processing delay budget (T3 or $T_{proc,1}$). When the minimum time interval between the time-domain position of the first channel and the first PSSCH resource determined through the above-mentioned two ways does not meet the condition, it is necessary to determine the time-domain position of the first channel again.

In other words, when the slot where the first channel is located is determined as the first slot as mentioned hereinabove, a time interval between the first slot and the PSSCH resource having the resource conflict is S and S<Y, it is necessary to determine the first slot again so that S≥Y. This is because, when a distance between the first slot and the PSSCH resource having the resource conflict is too small, there may be no enough time for the second terminal to process the information about the resource conflict carried in the first channel after the second terminal has received the first channel from the first terminal within the first slot, and thereby there is no enough time for the second terminal to change the transmission resource. At this time, the PSSCH resource conflict may still occur within the slot #13.

Figure 7:
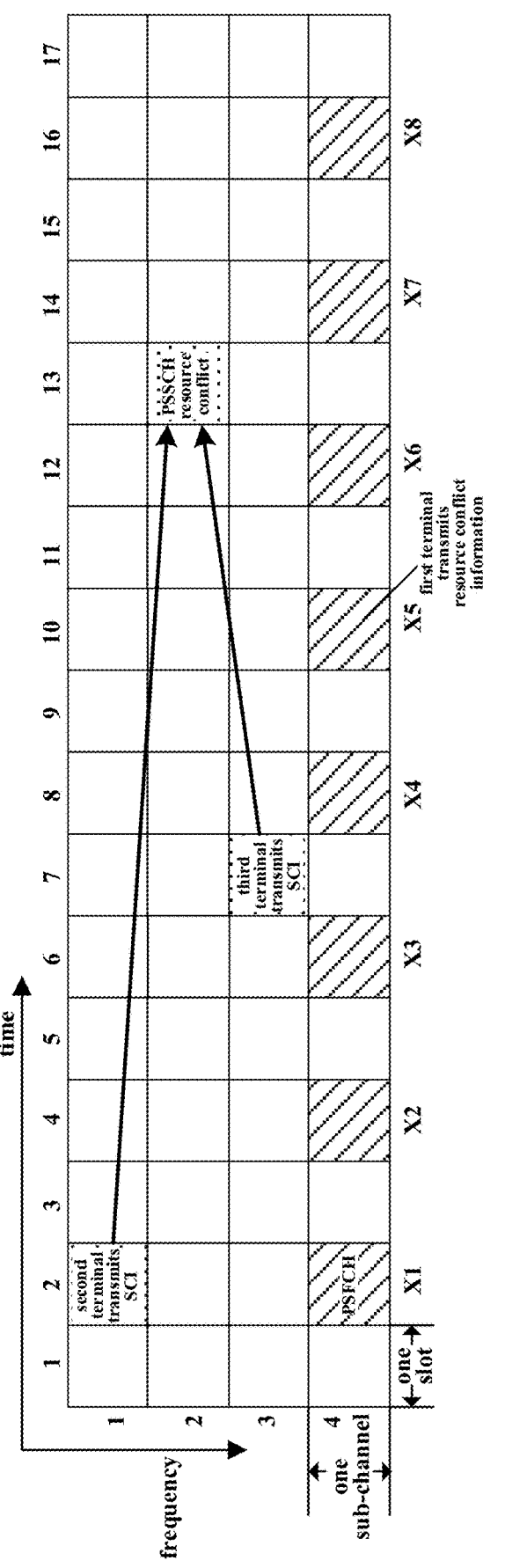
FIG. 7 is still yet another schematic view showing the signal transmission according to an embodiment of the present disclosure.

As shown in FIG. 7, on the basis of FIGS. 5(a) and 5(b), when Y=2, the first slot is determined as X6 as mentioned hereinabove. However, a time interval S between the slot X6 (the slot #12) and the PSSCH resource having the resource conflict (the slot #13) is one slot, i.e., S<Y. Hence, it is necessary to determine the first slot again as mentioned in FIGS. 5(a) and 5(b), and the slot X5 is selected as the first slot. At this time, S=3, so it is able to meet the condition S≥Y.

Through the above timing method of the first channel, the minimum time interval between the time-domain position of the first channel and the PSSCH resource having the resource conflict is limited as Y, so as to enable the second terminal to process the information in the first channel in time, thereby to improve a resource coordination effect.

In the embodiments of the present disclosure, the first terminal transmits the indication information to the second terminal through the first channel, and the indication information is used to indicate whether there is the potential resource conflict on the target PSSCH resource or there is the detected resource conflict on the target PSSCH resource. Accordingly, apart from a resource conflict sensed by the second terminal itself, a content in the indication information is further taken into consideration when the second terminal selects the resource. As a result, it is able to reduce a probability of data packet transmission failures due to a resource collision, thereby to improve a transmission success rate of a Sidelink data packet.

Based on the above, prior to Step 101, whether the first channel is configured into a target resource pool is further determined. In actual use, the first terminal, or the second terminal or the other terminal or device determines whether the first channel is configured into the target resource pool. When the second terminal or the other terminal or device determines whether the first channel is configured into the target resource pool, the second terminal or the other terminal or device transmits the result of the determination to the first terminal, and then the first terminal determines whether the first channel is configured into the target resource pool in accordance with the notification from the second terminal or the other terminal or device. In this case, when the first channel is configured into the target resource pool, the first terminal transmits the indication information to the second terminal through the first channel.

The quantity of RBs in a candidate resource set for the first channel in the target resource pool is determined in accordance with the quantity of sub-channels in the target resource pool and a period for transmitting the indication information through the first channel. For example, the quantity of RBs in the candidate resource set for the first channel in the target resource pool is an integral multiple of a product of the quantity (Q) of sub-channels in the target resource pool and the period (P) of the first channel resource.

The candidate resource set is determined through one or more of the followings: (1) mapping a first channel candidate resource in accordance with a slot number of a PSSCH associated with the first channel and a number of a start sub-channel occupied by the transmission of the PSSCH, so as to obtain the candidate resource set; or (2) mapping the first channel candidate resource in accordance with the slot number of the PSSCH associated with the first channel and numbers of all sub-channels occupied by the transmission of the PSSCH, so as to obtain the candidate resource set.

Figure 8:
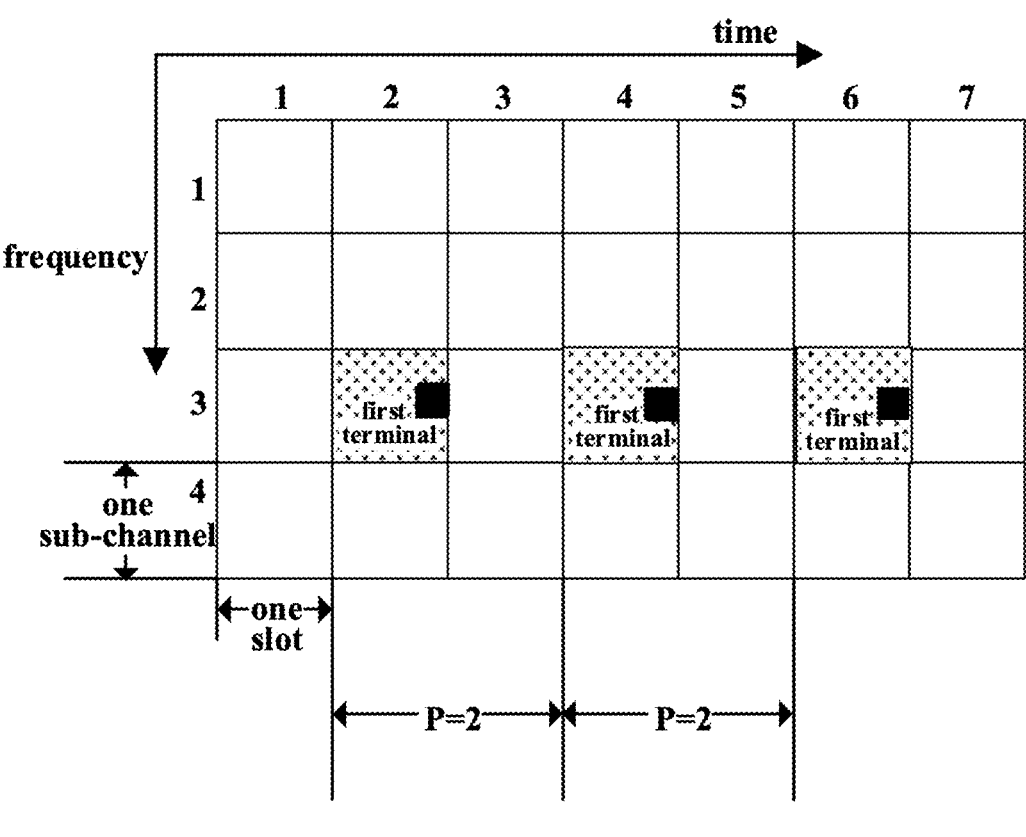
FIG. 8 is still yet another schematic view showing the signal transmission according to an embodiment of the present disclosure.

When the quantity of RBs in the candidate resource set for the first channel in a resource pool is determined as mentioned hereinabove, it is able to transmit the first channel through enough resources. For example, in FIG. 8, the quantity Q of sub-channels in a resource pool is 4 and the period P of the first channel resource is 2, so the quantity of RBs in the candidate resource set for the first channel in the resource pool is an integral multiple of 8.

In (1), when the first channel candidate resource is mapped in accordance with the slot number of the PSSCH associated with the first channel and the number of the start sub-channel occupied by the transmission of the PSSCH, merely the number of the start sub-channel occupied by the transmission of the PSSCH is involved, so there are fewer available first channel candidate resources. In (2), when the first channel candidate resource is mapped in accordance with the slot number of the PSSCH associated with the first channel and the numbers of all sub-channels occupied by the transmission of the PSSCH, the numbers of all the sub-channels occupied by transmission of the PSSCH are involved, so there are more available first channel candidate resources.

Based on the above-mentioned method for obtaining the candidate resource set for the first channel, it is able for a terminal A to determine the candidate resource set used by the first channel, thereby to prevent the occurrence of any resource collision when selecting the transmission resource for the first channel.

According to the embodiments of the present disclosure, the first terminal transmits the indication information to the second terminal through the first channel, and the indication information is used to indicate whether there is the potential resource conflict on the target PSSCH resource or there is the detected resource conflict on the target PSSCH resource. Accordingly, apart from a resource conflict sensed by the second terminal itself, a content in the indication information is further taken into consideration when the second terminal selects the resource. As a result, it is able to reduce a probability of data packet transmission failures due to a resource collision, thereby to improve a transmission success rate of a Sidelink data packet.

Figure 9:
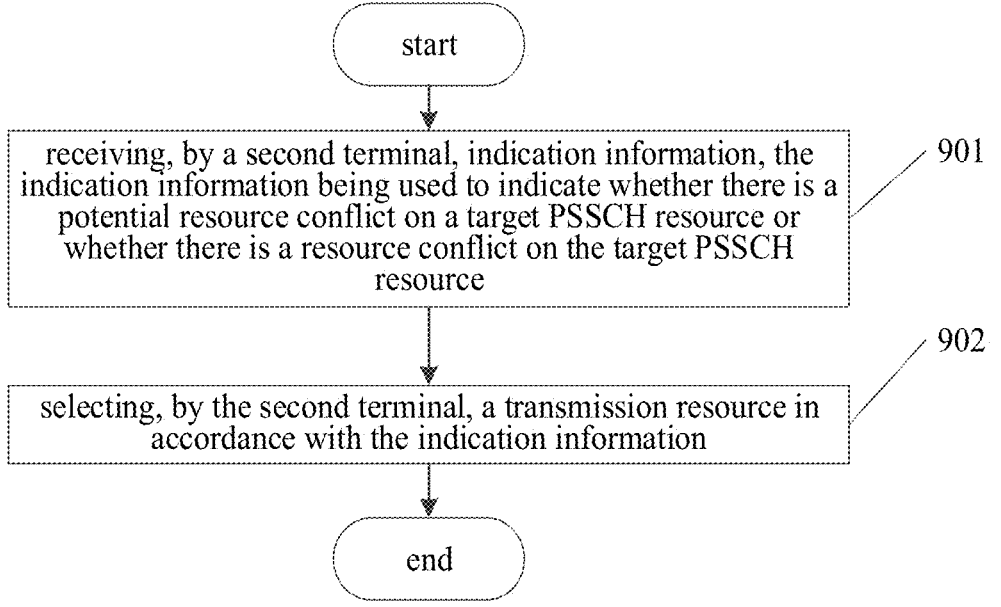
FIG. 9 is another flow chart of the information processing method according to an embodiment of the present disclosure.

As shown in FIG. 9, the present disclosure further provides in some embodiments an information processing method, which includes: Step 901 of receiving, by a second terminal, indication information through a first channel, the indication information being used to indicate whether there is a potential resource conflict on a target PSSCH resource or whether there is a detected resource conflict on the target PSSCH resource; and Step 902 of selecting, by the second terminal, a transmission resource in accordance with the indication information. A time-domain position of the first channel is related to a time-domain position of a first PSSCH resource, or the time-domain position of the first channel is related to a time-domain position of a second PSSCH resource, the first PSSCH resource is a PSSCH resource on which there is the potential resource conflict, and the second PSSCH resource is a PSSCH resource on which there is the detected resource conflict.

When selecting the transmission resource, the second terminal takes the resource conflict sensed by itself and a content in the indication information into consideration, so as to prevent the occurrence of resource collision.

According to the embodiments of the present disclosure, the first terminal transmits the indication information to the second terminal through the first channel, and the indication information is used to indicate whether there is the potential resource conflict on the target PSSCH resource or there is the detected resource conflict on the target PSSCH resource. Accordingly, apart from a resource conflict sensed by the second terminal itself, a content in the indication information is further taken into consideration when the second terminal selects the resource. As a result, it is able to reduce a probability of data packet transmission failures due to a resource collision, thereby to improve a transmission success rate of a Sidelink data packet.

Schemes in the embodiments of the present disclosure may be applied to various systems, especially a 5G system, e.g., Global System of Mobile communication (GSM), Code Division Multiple Access (CDMA) system, Wideband Code Division Multiple Access (WCDMA) system, General Packet Radio Service (GPRS) system, Long Term Evolution (LTE) system, LTE Frequency Division Duplexing (FDD) system, LTE Time Division Duplexing (TDD) system, Long Term Evolution Advanced (LTE-A) system, Universal Mobile Telecommunication System (UMTS), Worldwide Interoperability for Microwave Access (WiMAX) system, or $5^{th}$-Generation (5G) New Radio (NR) system. Each of these systems includes a terminal device and a network device. Each system further includes a core network part, e.g., an Evolved Packet System (EPS) or 5G system (5GS).

The terminal involved in the embodiments of the present disclosure is a device for providing voice data and/or any other service data to a user, e.g., a handheld device having a wireless connection function, or any other processing device capable of being connected to a wireless modem. In different systems, the terminal device may have different names. For example, in a 5G system, the terminal device is called as User Equipment (UE). A wireless terminal device communicates with one or more Core Networks (CNs) via a Radio Access Network (RAN). The wireless terminal device may be a mobile terminal, e.g., a mobile phone (or cellular phone), or a computer having the mobile terminal device, e.g., a portable, pocket-sized, handheld, built-in or vehicle-mounted mobile device, which are capable of exchanging voice and/or data with the RAN. For example, the wireless terminal device may be a Personal Communication Service (PCS) telephone, a cordless telephone, a Session Initiation Protocol (SIP) phone, a Wireless Local Loop (WLL) station, or a Personal Digital Assistant (PDA). In addition, the wireless terminal device may also be called as system, subscriber unit, subscriber station, mobile station, mobile, remote station, remote terminal, access terminal, user terminal, user agent or user device, which will not be further particularly defined herein.

Figure 10:
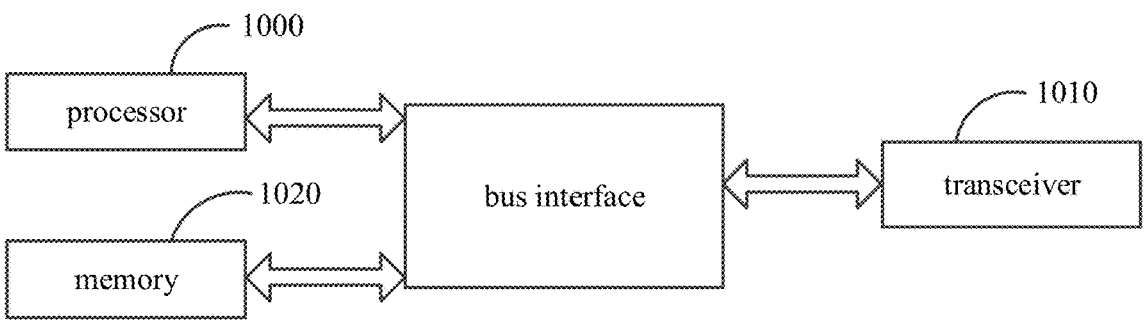
FIG. 10 is a block diagram of a first terminal according to an embodiment of the present disclosure.

As shown in FIG. 10, the present disclosure further provides in some embodiments a first terminal, which includes a processor 1000 and a transceiver 1010. The processor 1000 is configured to read a program in a memory 1020, so as to transmit indication information to a second terminal through a first channel, and the indication information is used to indicate whether there is a potential resource conflict on a target PSSCH resource or whether there is a detected resource conflict on the target PSSCH resource. A time-domain position of the first channel is related to a time-domain position of a first PSSCH resource, or the time-domain position of the first channel is related to a time-domain position of a second PSSCH resource, the first PSSCH resource is a PSSCH resource on which there is the potential resource conflict, and the second PSSCH resource is a PSSCH resource on which there is the detected resource conflict. The transceiver 1010 is configured to receive and transmit data under the control of the processor 1000.

In FIG. 10, bus architecture includes a number of buses and bridges connected to each other, so as to connect various circuits for one or more processors 1000 and one or more memories 1020. In addition, as is known in the art, the bus architecture may be used to connect any other circuits, such as a circuit for a peripheral device, a circuit for a voltage stabilizer and a power management circuit. A bus interface is provided, and the transceiver 1010 consists of a plurality of elements, i.e., a transmitter and a receiver for communication with any other devices over a transmission medium. The processor 1000 takes charge of managing the bus architecture as well as general processings. The memory 1020 stores therein data for the operation of the processor 1000.

The processor 1000 is a Central Processing Unit (CPU), an Application Specific Integrated Circuit (ASIC), a Field-Programmable Gate Array (FPGA) or a Complex Programmable Logic Device (CPLD). The processor may also use multi-core architecture.

The processor 1000 takes charge of managing the bus architecture as well as general processings. The memory 1020 stores therein data for the operation of the processor 1000.

In addition, the time-domain position of the first channel is related to a time-domain position where SCI of the first PSSCH resource is located, or the time-domain position of the first channel is related to a time-domain position where SCI of the second PSSCH resource is located.

In addition, the first channel is a sequence-based second channel, or the first channel is a Type2 PSFCH, or the first channel is a PSFCH.

The processor 1000 is further configured to read the program, so as to transmit the indication information to the second terminal through the first channel in accordance with a predetermined period, and the period is equal to n0 slots, where n0=1, 2 or 4.

The processor 1000 is further configured to read the program, so as to transmit the indication information to the second terminal through the first channel within a first slot, and the first slot is an $N^{th}$ slot before a slot where the first PSSCH resource is located, or the first slot is determined in accordance with a slot where a transmission occasion of a latest PSFCH before the first PSSCH resource is located, where N is an integer greater than or equal to 0.

The processor 1000 is further configured to read the program, so as to: determine the first slot as the slot where the transmission occasion of the latest PSFCH before the first PSSCH resource is located; or determine the first slot as a $(K1+n1)^{th}$ slot or a $(K1-n1)^{th}$ slot. The slot where the transmission occasion of the latest PSFCH before the first PSSCH resource is located is a $(K1)^{th}$ slot, where K1 and n1 are both integers greater than or equal to 0.

The processor 1000 is further configured to read the program, so as to transmit the indication information to the second terminal through the first channel within a first slot, and the first slot is an $M^{th}$ slot after a slot where the second PSSCH resource is located, or the first slot is determined in accordance with a slot where a transmission occasion of a latest PSFCH after the second PSSCH resource is located, where M is an integer greater than or equal to 0.

The processor 1000 is further configured to read the program, so as to: determine the first slot as the slot where the transmission occasion of the latest PSFCH after the second PSSCH resource is located; or determine the first slot as a $(K2+n2)^{th}$ slot or a $(K2-n2)^{th}$ slot, and the slot where the transmission occasion of the latest PSFCH after the second PSSCH resource is located is a $(K2)^{th}$ slot, where K2 and n2 are both integers greater than or equal to 0.

A minimum time interval between the time-domain position of the first channel and the first PSSCH resource is determined in accordance with a terminal processing delay budget, or a minimum time interval between the time-domain position of the first channel and the second PSSCH resource is determined by the terminal processing delay budget.

The processor 1000 is further configured to read the program, so as to determine whether the first channel has been configured into a target resource pool. The transmitting the indication information to the second terminal through the first channel includes, when determining that the first channel has been configured into the target resource pool, transmitting the indication information to the second terminal through the first channel.

The quantity of RBs in a candidate resource set for the first channel in the target resource pool is determined in accordance with the quantity of sub-channels in the target resource pool and a period for transmitting the indication information through the first channel.

The candidate resource set is determined through one or more of the followings: obtaining the candidate resource set in accordance with a slot number of a PSSCH associated with the first channel and a number of a start sub-channel occupied by the transmission of the PSSCH; or obtaining the candidate resource set in accordance with the slot number of the PSSCH associated with the first channel and numbers of all sub-channels occupied by the transmission of the PSSCH.

Here, it should be appreciated that, the terminal in the embodiments of the present disclosure is used to implement the above-mentioned method for the first terminal with a same technical effect, which will thus not be further particularly defined herein.

Figure 11:
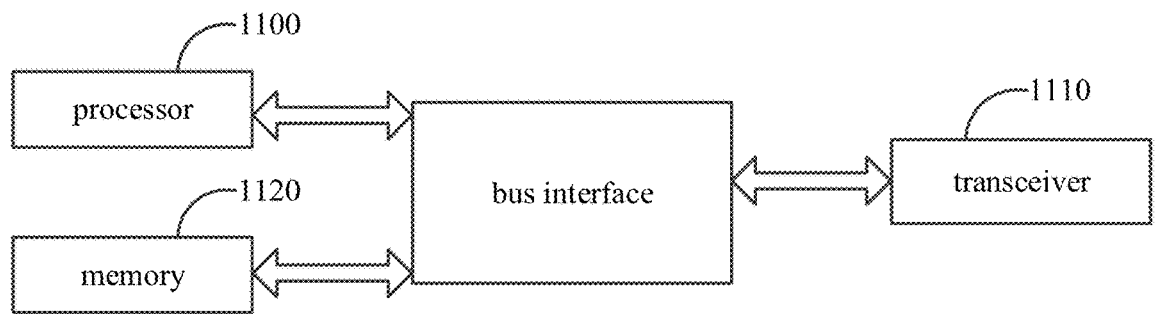
FIG. 11 is a block diagram of a second terminal according to an embodiment of the present disclosure.

As shown in FIG. 11, the present disclosure provides in some embodiments a second terminal, which includes a processor 1100 and a transceiver 1110. The processor 1100 is configured to read a program in a memory 1120, so as to: transmit indication information to a second terminal through a first channel, and the indication information is used to indicate whether there is a potential resource conflict on a target PSSCH resource or whether there is a detected resource conflict on the target PSSCH resource; receive indication information through a first channel, the indication information being used to indicate whether there is a potential resource conflict on a target PSSCH resource or whether there is a detected resource conflict on the target PSSCH resource; and select a transmission resource in accordance with the indication information. A time-domain position of the first channel is related to a time-domain position of a first PSSCH resource, or the time-domain position of the first channel is related to a time-domain position of a second PSSCH resource, the first PSSCH resource is a PSSCH resource on which there is the potential resource conflict, and the second PSSCH resource is a PSSCH resource on which there is the detected resource conflict. The transceiver 1110 is configured to receive and transmit data under the control of the processor 1100.

In FIG. 11, bus architecture may include a number of buses and bridges connected to each other, so as to connect various circuits for one or more processors 1100 and one or more memories 1120. In addition, as is known in the art, the bus architecture may be used to connect any other circuits, such as a circuit for a peripheral device, a circuit for a voltage stabilizer and a power management circuit. A bus interface may be provided, and the transceiver 1110 may consist of a plurality of elements, i.e., a transmitter and a receiver for communication with any other devices over a transmission medium. The processor 1100 may take charge of managing the bus architecture as well as general processings. The memory 1120 may store therein data for the operation of the processor 1100.

The processor 1100 may be a CPU, an ASIC, an FPGA or a CPLD. The processor may also use a multi-core architecture.

The processor 1100 may take charge of managing the bus architecture as well as general processings. The memory 1120 may store therein data for the operation of the processor 1100.

Here, it should be appreciated that, the terminal in the embodiments of the present disclosure is used to implement the above-mentioned method for the second terminal with a same technical effect, which will not be further particularly defined herein.

Figure 12:
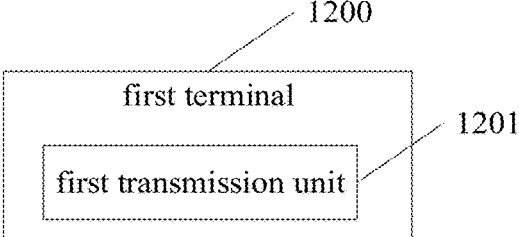
FIG. 12 is another block diagram of the first terminal according to an embodiment of the present disclosure.

As shown in FIG. 12, the present disclosure further provides in some embodiments a first terminal, which includes a first transmission unit 1201 configured to transmit indication information to a second terminal through a first channel, the indication information being used to indicate whether there is a potential resource conflict on a target PSSCH resource or whether there is a detected resource conflict on the target PSSCH resource. A time-domain position of the first channel is related to a time-domain position of a first PSSCH resource, or the time-domain position of the first channel is related to a time-domain position of a second PSSCH resource, the first PSSCH resource is a PSSCH resource on which there is the potential resource conflict, and the second PSSCH resource is a PSSCH resource on which there is the detected resource conflict.

In addition, the time-domain position of the first channel is related to a time-domain position where SCI of the first PSSCH resource is located, or the time-domain position of the first channel is related to a time-domain position where SCI of the second PSSCH resource is located.

In addition, the first channel is a sequence-based second channel, or the first channel is a Type2 PSFCH, or the first channel is a PSFCH.

In addition, the first transmission unit is configured to transmit the indication information to the second terminal through the first channel in accordance with a predetermined period, and the period is equal to n0 slots, where n0=1, 2 or 4.

In addition, the first transmission unit is configured to transmit the indication information to the second terminal through the first channel within a first slot, and the first slot is an Nth slot before a slot where the first PSSCH resource is located, or the first slot is determined in accordance with a slot where a transmission occasion of a latest PSFCH before the first PSSCH resource is located, where N is an integer greater than or equal to 0.

In addition, the first slot being determined in accordance with the slot where the transmission occasion of the latest PSFCH before the first PSSCH resource is located comprises, the first slot is the slot where the transmission occasion of the latest PSFCH before the first PSSCH resource is located; or the first slot is a $(K1+n1)^{th}$ slot or a $(K1-n1)^{th}$ slot, and the slot where the transmission occasion of the latest PSFCH before the first PSSCH resource is located is a $(K1)^{th}$ slot, where K1 and n1 are both integers greater than or equal to 0.

In addition, the first transmission unit is configured to transmit the indication information to the second terminal through the first channel within a first slot, and the first slot is an $M^{th}$ slot after a slot where the second PSSCH resource is located, or the first slot is determined in accordance with a slot where a transmission occasion of a latest PSFCH after the second PSSCH resource is located, where M is an integer greater than or equal to 0.

In addition, the first slot being determined in accordance with the slot where the transmission occasion of the latest PSFCH after the second PSSCH resource is located comprises, the first slot is the slot where the transmission occasion of the latest PSFCH after the second PSSCH resource is located; or the first slot is a $(K2+n2)^{th}$ slot or a $(K2-n2)^{th}$ slot, and the slot where the transmission occasion of the latest PSFCH after the second PSSCH resource is located is a $(K2)^{th}$ slot, where K2 and n2 are both integers greater than or equal to 0.

In addition, a minimum time interval between the time-domain position of the first channel and the first PSSCH resource is determined in accordance with a terminal processing delay budget, or a minimum time interval between the time-domain position of the first channel and the second PSSCH resource is determined by the terminal processing delay budget.

In addition, the terminal further includes a first determination unit configured to determine whether the first channel has been configured into a target resource pool, and the first transmission unit is configured to, when determining that the first channel has been configured into the target resource pool, transmit the indication information to the second terminal through the first channel.

In addition, the quantity of RBs in a candidate resource set for the first channel in the target resource pool is determined in accordance with the quantity of sub-channels in the target resource pool and a period for transmitting the indication information through the first channel.

In addition, the candidate resource set is determined through one or more of the followings: obtaining the candidate resource set in accordance with a slot number of a PSSCH associated with the first channel and a number of a start sub-channel occupied by the transmission of the PSSCH; or obtaining the candidate resource set in accordance with the slot number of the PSSCH associated with the first channel and numbers of all sub-channels occupied by the transmission of the PSSCH.

Here, it should be appreciated that, the terminal in the embodiments of the present disclosure is used to implement the above-mentioned method for the first terminal with a same technical effect, which will not be further particularly defined herein.

Figure 13:
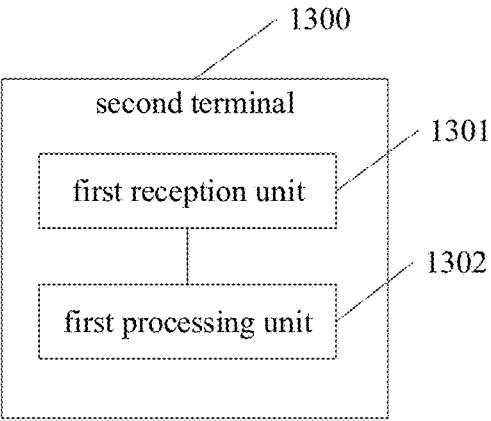
FIG. 13 is another block diagram of the second terminal according to an embodiment of the present disclosure.

As shown in FIG. 13, the present disclosure further provides in some embodiments a second terminal, which includes: a first reception unit 1301 configured to receive indication information, the indication information being used to indicate whether there is a potential resource conflict on a target PSSCH resource or whether there is a detected resource conflict on the target PSSCH resource; and a first processing unit 1302 configured to select a transmission resource in accordance with the indication information. A time-domain position of the first channel is related to a time-domain position of a first PSSCH resource, or the time-domain position of the first channel is related to a time-domain position of a second PSSCH resource, the first PSSCH resource is a PSSCH resource on which there is the potential resource conflict, and the second PSSCH resource is a PSSCH resource on which there is the detected resource conflict.

Here, it should be appreciated that, the terminal in the embodiments of the present disclosure is used to implement the above-mentioned method for the second terminal with a same technical effect, which will not be further particularly defined herein.

It should be appreciated that, the units in the embodiments of the present disclosure are for illustrative purposes, and they are provided merely on the basis of their logic functions. The units may be integrated in a processing unit, or physically separated from each other, or two or more units may be integrated in one unit. The integrated units may be implemented in the form of hardware or a software functional unit.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The present disclosure further provides in some embodiments a readable storage medium storing therein a computer program. The computer program is used to be executed by a processor to implement the above-mentioned method with a same technical effect, which will not be further particularly defined herein. The readable storage medium may be any available medium or data storage device capable of being accessed by a processor, which includes, but not limited to, a magnetic memory (e.g., floppy disk, hard disk, magnetic tape, or Magnetic Optical disk (MO)), an optical memory (e.g., Compact Disk (CD), Digital Video Disk (DVD), Blue-ray Disk (BD), or High-definition Versatile Disk (HVD)), or a semiconductor memory (e.g., ROM, Electrically Programmable ROM (EPROM), Electrically Erasable PROM (EEPROM), NAND flash, or Solid-State Disk (SSD)).

It should be appreciated that, such words as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

Through the above-mentioned description, it may be apparent for a person skilled in the art that the present disclosure may be implemented by software as well as a necessary common hardware platform, or by hardware, and the former may be better in most cases. Based on this, the technical solutions of the present disclosure, partial or full, or parts of the technical solutions of the present disclosure contributing to the related art, may appear in the form of software products, which may be stored in a storage medium (e.g., ROM/RAM, magnetic disk or optical disk) and include several instructions so as to enable a terminal device (mobile phone, computer, server, air conditioner or network device) to execute the method in the embodiments of the present disclosure.

It should be further appreciated that, the above modules are divided merely on the basis of their logic functions, and in actual use, they may be completely or partially integrated into a physical entity, or physically separated from each other. These modules may be implemented by calling software through a processing element, or implemented in the form of hardware. For example, the determination module may be processing elements arranged separately, or integrated into a chip of the above-mentioned device. In addition, the determination module may be stored in the memory of the above-mentioned device in the form of a program code, and may be called and executed by a processing element of the above-mentioned device so as to achieve the above functions. The other modules may be implemented in a similar manner. All or parts of the modules may be integrated together or arranged separately. Here, the modules, units or assemblies may each of an Integrated Circuit (IC) having a signal processing capability. During the implementation, the steps of the method or the modules may be implemented through an integrated logic circuit of the processing element in the form of hardware or through instructions in the form of software.

For example, the above modules, units, sub-units or sub-modules may be one or more ICs capable of implementing the above-mentioned method, e.g., one or more Application Specific Integrated Circuits (ASICs), one or more Digital Signal Processors (DSPs), or one or more Field Programmable Gate Array (FPGA). For another example, when a certain module is implemented by calling a program code through a processing element, the processing element may be a general-purpose processor, e.g., a Central Processing Unit (CPU) or any other processor capable of calling the program code. These modules may be integrated together and implemented in the form of system-on-a-chip (SOC).

Such words as "first" and "second" involved in the specification and the appended claims are merely used to differentiate different objects rather than to represent any specific order. It should be appreciated that, the data used in this way may be replaced with each other, so as to implement the embodiments in an order other than that shown in the drawings or described in the specification. In addition, such terms as "include" or "including" or any other variations involved in the present disclosure intend to provide non-exclusive coverage, so that a procedure, method, system, product or device including a series of steps or units may also include any other elements not listed herein, or may include any inherent steps or units of the procedure, method, system, product or device. The expression "and/or" in the description and the appended claims is merely used to represent at least one of the objects before and after the expression. For example, "A and/or B and/or C" represents seven situations, i.e., there is only A, there is only B, there is only C, there are both A and B, there are both B and C, there are both A and C, and there are A, B and C. Similarly, the phrase "at least one of A or B" in the specification and the appended claims shall be understood as "there is only A, there is only B, or there are both A and B".

The embodiments of the present disclosure have been described above in conjunction with the accompanying drawings. However, the present disclosure is not limited to the above-mentioned specific implementations. The above-mentioned specific implementations are only illustrative and not restrictive. Under the teaching of the present disclosure, a person skilled in the art may make many forms without departing from the purpose of the present disclosure and the scope of the claims, all of which fall within the protection of the present disclosure.

What is claimed is:

1. An information processing method, comprising:
    transmitting, by a first terminal, indication information to a second terminal through a first channel, the indication information being used to indicate whether there is a potential resource conflict on a target Physical Sidelink Shared Channel (PSSCH) resource or whether there is a detected resource conflict on the target PSSCH resource,
    wherein a time-domain position of the first channel is related to a time-domain position of a first PSSCH resource, or the time-domain position of the first channel is related to a time-domain position of a second PSSCH resource;
    the first PSSCH resource is a PSSCH resource on which there is the potential resource conflict, and the second PSSCH resource is a PSSCH resource on which there is the detected resource conflict;
    wherein prior to transmitting, by the first terminal, the indication information to the second terminal through the first channel, the information processing method further comprises:
        determining whether the first channel has been configured into a target resource pool,
    wherein the transmitting, by the first terminal, the indication information to the second terminal through the first channel comprises:
        when determining that the first channel has been configured into the target resource pool, transmitting, by the first terminal, the indication information to the second terminal through the first channel.

2. The information processing method according to claim 1, wherein
    the time-domain position of the first channel is related to a time-domain position where Sidelink Control Information (SCI) of the first PSSCH resource is located; or
    the time-domain position of the first channel is related to a time-domain position where SCI of the second PSSCH resource is located.

3. The information processing method according to claim 1, wherein the first channel is a sequence-based second channel, or the first channel is a Type2 Physical Sidelink Feedback Channel (PSFCH), or the first channel is a PSFCH.

4. The information processing method according to claim 1, wherein the transmitting, by the first terminal, the indication information to the second terminal through the first channel comprises:

transmitting, by the first terminal, the indication information to the second terminal through the first channel in accordance with a predetermined period, wherein the period is equal to n0 slots, where n0=1, 2 or 4.

5. The information processing method according to claim 1, wherein the transmitting, by the first terminal, the indication information to the second terminal through the first channel comprises:

transmitting, by the first terminal, the indication information to the second terminal through the first channel within a first slot, wherein the first slot is an $N^{th}$ slot before a slot where the first PSSCH resource is located, or the first slot is determined in accordance with a slot where a transmission occasion of a latest PSFCH before the first PSSCH resource is located, where N is an integer greater than or equal to 0.

6. The information processing method according to claim 5, wherein the first slot being determined in accordance with the slot where the transmission occasion of the latest PSFCH before the first PSSCH resource is located comprises:

that the first slot is the slot where the transmission occasion of the latest PSFCH before the first PSSCH resource is located; or that the first slot is a $(K1+n1)^{th}$ slot or a $(K1-n1)^{th}$ slot, and the slot where the transmission occasion of the latest PSFCH before the first PSSCH resource is located is a $(K1)^{th}$ slot, where K1 and n1 are both integers greater than or equal to 0.

7. The information processing method according to claim 5, wherein a minimum time interval between the time-domain position of the first channel and the first PSSCH resource is determined in accordance with a terminal processing delay budget; or a minimum time interval between the time-domain position of the first channel and the second PSSCH resource is determined by the terminal processing delay budget.

8. The information processing method according to claim 1, wherein the transmitting, by the first terminal, the indication information to the second terminal through the first channel comprises:

transmitting, by the first terminal, the indication information to the second terminal through the first channel within a first slot, wherein the first slot is an $M^{th}$ slot after a slot where the second PSSCH resource is located, or the first slot is determined in accordance with a slot where a transmission occasion of a latest PSFCH after the second PSSCH resource is located, where M is an integer greater than or equal to 0.

9. The information processing method according to claim 8, wherein the first slot being determined in accordance with the slot where the transmission occasion of the latest PSFCH after the second PSSCH resource is located comprises:

that the first slot is the slot where the transmission occasion of the latest PSFCH after the second PSSCH resource is located; or that the first slot is a $(K2+n2)^{th}$ slot or a $(K2-n2)^{th}$ slot, and the slot where the transmission occasion of the latest PSFCH after the second PSSCH resource is located is a $(K2)^{th}$ slot, where K2 and n2 are both integers greater than or equal to 0.

10. The information processing method according to claim 1, wherein the quantity of Resource Blocks (RBs) in a candidate resource set for the first channel in the target resource pool is determined in accordance with the quantity of sub-channels in the target resource pool and a period for transmitting the indication information through the first channel.

11. The information processing method according to claim 10, wherein the candidate resource set is determined through one or more of the followings:

obtaining the candidate resource set in accordance with a slot number of a PSSCH associated with the first channel and a number of a start sub-channel occupied by the transmission of the PSSCH; or obtaining the candidate resource set in accordance with the slot number of the PSSCH associated with the first channel and numbers of all sub-channels occupied by the transmission of the PSSCH.

12. A non-transitory processor-readable storage medium storing therein a computer program, wherein the computer program is used to be executed by a processor to implement the information processing method according to claim 1.

13. An information processing method, comprising:

receiving, by a second terminal, indication information through a first channel, the indication information being used to indicate whether there is a potential resource conflict on a target Physical Sidelink Shared Channel (PSSCH) resource or whether there is a detected resource conflict on the target PSSCH resource;

selecting, by the second terminal, a transmission resource in accordance with the indication information, wherein a time-domain position of the first channel is related to a time-domain position of a first PSSCH resource, or the time-domain position of the first channel is related to a time-domain position of a second PSSCH resource;

the first PSSCH resource is a PSSCH resource on which there is the potential resource conflict, and the second PSSCH resource is a PSSCH resource on which there is the detected resource conflict;

wherein the indication information is received through the first channel when the first channel has been configured into a target resource pool.

14. A second terminal, comprising a memory, a transceiver and a processor, wherein the memory is configured to store therein a computer program, the transceiver is configured to receive and transmit data under the control of the processor, the processor is configured to read the computer program in the memory to implement the information processing method according to claim 13.

15. A first terminal, comprising a memory, a transceiver and a processor, wherein the memory is configured to store therein a computer program, the transceiver is configured to receive and transmit data under the control of the processor, the processor is configured to read the computer program in the memory to:

transmit indication information to a second terminal through a first channel, wherein the indication information is used to indicate whether there is a potential resource conflict on a target Physical Sidelink Shared Channel (PSSCH) resource or whether there is a detected resource conflict on the target PSSCH resource, wherein a time-domain position of the first channel is related to a time-domain position of a first PSSCH resource, or the time-domain position of the first channel is related to a time-domain position of a second PSSCH resource;

the first PSSCH resource is a PSSCH resource on which there is the potential resource conflict, and the second PSSCH resource is a PSSCH resource on which there is the detected resource conflict;

wherein the processor is further configured to read the computer program in the memory to:

prior to transmitting the indication information to the second terminal through the first channel, determine whether the first channel has been configured into a target resource pool, wherein the transmitting the indication information to the second terminal through the first channel comprises:

when determining that the first channel has been configured into the target resource pool, transmitting the indication information to the second terminal through the first channel.

16. The first terminal according to claim 15, wherein the time-domain position of the first channel is related to a time-domain position where SCI of the first PSSCH resource is located; or the time-domain position of the first channel is related to a time-domain position where SCI of the second PSSCH resource is located.

17. The first terminal according to claim 15, wherein the first channel is a sequence-based second channel, or the first channel is a Type2 PSFCH, or the first channel is a PSFCH.

18. The first terminal according to claim 15, wherein the time-domain position of the first channel is related to a time-domain position where SCI of the first PSSCH resource is located; or the time-domain position of the first channel is related to a time-domain position where SCI of the second PSSCH resource is located.

19. The first terminal according to claim 15, wherein the first channel is a sequence-based second channel, or the first channel is a Type2 PSFCH, or the first channel is a PSFCH.

20. The first terminal according to claim 15, wherein the transmitting, by the first terminal, the indication information to the second terminal through the first channel comprises:

transmitting, by the first terminal, the indication information to the second terminal through the first channel within a first slot, wherein the first slot is an $N^{th}$ slot before a slot where the first PSSCH resource is located, or the first slot is determined in accordance with a slot where a transmission occasion of a latest PSFCH before the first PSSCH resource is located, where N is an integer greater than or equal to 0.

* * * * *